US008174437B2

(12) United States Patent
Whitehead

(10) Patent No.: US 8,174,437 B2
(45) Date of Patent: May 8, 2012

(54) SYSTEM AND METHOD FOR AUGMENTING DGNSS WITH INTERNALLY-GENERATED DIFFERENTIAL CORRECTION

(75) Inventor: Michael L. Whitehead, Scottsdale, AZ (US)

(73) Assignee: Hemisphere GPS LLC, Calgary, Alberta (CA)

( * ) Notice: Subject to any disclaimer, the term of this patent is extended or adjusted under 35 U.S.C. 154(b) by 297 days.

(21) Appl. No.: 12/511,821

(22) Filed: Jul. 29, 2009

(65) Prior Publication Data
US 2011/0025555 A1    Feb. 3, 2011

(51) Int. Cl.
G01S 19/41 (2010.01)
G01S 19/07 (2010.01)

(52) U.S. Cl. .............................. 342/357.24; 342/357.44

(58) Field of Classification Search ............. 342/357.24, 342/357.44
See application file for complete search history.

(56) References Cited

U.S. PATENT DOCUMENTS

| | | |
|---|---|---|
| 3,585,537 A | 6/1971 | Rennick et al. |
| 3,596,228 A | 7/1971 | Reed, Jr. et al. |
| 3,727,710 A | 4/1973 | Sanders et al. |
| 3,815,272 A | 6/1974 | Marleau |
| 3,899,028 A | 8/1975 | Morris et al. |
| 3,987,456 A | 10/1976 | Gelin |
| 4,132,272 A | 1/1979 | Holloway et al. |
| 4,170,776 A | 10/1979 | MacDoran |
| 4,180,133 A | 12/1979 | Collogan et al. |
| 4,398,162 A | 8/1983 | Nagai |
| 4,453,614 A | 6/1984 | Allen et al. |
| 4,529,990 A | 7/1985 | Brunner |
| 4,637,474 A | 1/1987 | Leonard |
| 4,667,203 A | 5/1987 | Counselman, III |
| 4,689,556 A | 8/1987 | Cedrone |
| 4,694,264 A | 9/1987 | Owens et al. |
| 4,710,775 A | 12/1987 | Coe |
| 4,714,435 A | 12/1987 | Stipanuk et al. |
| 4,739,448 A | 4/1988 | Rowe et al. |

(Continued)

FOREIGN PATENT DOCUMENTS
JP     07244150     9/1995
(Continued)

OTHER PUBLICATIONS

Parkinson, Bradford W., et al., "Global Positioning System: Theory and Applications, vol. II", Bradford W. Parkinson and James J. Spiker, Jr., eds., *Global Postioning System: Theory and Applicaitons*, vol. II, 1995, AIAA, Reston, VA, USA, pp. 3-50, (1995),3-50.

(Continued)

*Primary Examiner* — Gregory C Issing
(74) *Attorney, Agent, or Firm* — Law Office of Mark Brown LLC; Mark E. Brown

(57) ABSTRACT

In the invention, a rover receiver first utilizes data from a base Receiver, a DGNSS reference network, or other differential source to compute a differentially corrected location. Then, using this location and data observed only at the rover, the rover computes an internal set of differential corrections that are stored in computer memory, updated as necessary, and applied in future times to correct observations taken by the rover. The possibly mobile rover receiver, therefore, corrects its own observations with differential corrections computed from its own past observations; relying on external differential for the sole purpose of establishing a reference location, and this is unlike prior art.

8 Claims, 8 Drawing Sheets

U.S. PATENT DOCUMENTS

| | | | |
|---|---|---|---|
| 4,751,512 A | 6/1988 | Longaker |
| 4,769,700 A | 9/1988 | Pryor |
| 4,785,463 A | 11/1988 | Jane et al. |
| 4,802,545 A | 2/1989 | Nystuen et al. |
| 4,812,991 A | 3/1989 | Hatch |
| 4,813,991 A | 3/1989 | Hale |
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A | 4/1993 | Geier |
| 5,207,239 A | 5/1993 | Schwitalia |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A | 8/1994 | Teach |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,364,093 A * | 11/1994 | Huston et al. ................. 473/407 |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen et al. |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland et al. |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen et al. |
| 5,664,632 A | 9/1997 | Frasier |
| 5,673,491 A | 10/1997 | Brenna et al. |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvili |
| 5,725,230 A | 3/1998 | Walkup |
| 5,731,786 A | 3/1998 | Abraham et al. |
| 5,739,785 A | 4/1998 | Allison et al. |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cosenza et al. |
| 5,875,408 A | 2/1999 | Bendett et al. |
| 5,877,725 A | 3/1999 | Kalafus |
| 5,890,091 A | 3/1999 | Talbot et al. |
| 5,899,957 A | 5/1999 | Loomis |
| 5,906,645 A | 5/1999 | Kagawa et al. |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A | 7/1999 | Greatline et al. |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,933,110 A | 8/1999 | Tang |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Van Dusseldorp |
| 5,944,770 A | 8/1999 | Enge et al. |
| 5,945,917 A | 8/1999 | Harry |
| 5,949,371 A | 9/1999 | Nichols |
| 5,955,973 A | 9/1999 | Anderson |
| 5,956,250 A | 9/1999 | Gudat et al. |
| 5,969,670 A | 10/1999 | Kalafus et al. |
| 5,987,383 A | 11/1999 | Keller et al. |
| 6,014,101 A | 1/2000 | Loomis |
| 6,014,608 A | 1/2000 | Seo |
| 6,018,313 A | 1/2000 | Engelmayer et al. |
| 6,023,239 A | 2/2000 | Kovach |
| 6,052,647 A | 4/2000 | Parkinson et al. |
| 6,055,477 A | 4/2000 | McBurney et al. |
| 6,057,800 A | 5/2000 | Yang et al. |
| 6,061,390 A | 5/2000 | Meehan et al. |
| 6,061,632 A | 5/2000 | Dreier |
| 6,062,317 A | 5/2000 | Gharsalli |
| 6,069,583 A | 5/2000 | Silvestrin et al. |
| 6,076,612 A | 6/2000 | Carr et al. |
| 6,081,171 A | 6/2000 | Ella |
| 6,100,842 A | 8/2000 | Dreier et al. |
| 6,122,595 A | 9/2000 | Varley et al. |
| 6,128,574 A | 10/2000 | Diekhans |
| 6,144,335 A | 11/2000 | Rogers |
| 6,191,730 B1 | 2/2001 | Nelson, Jr. |
| 6,191,733 B1 | 2/2001 | Dizchavez |
| 6,198,430 B1 | 3/2001 | Hwang et al. |
| 6,198,992 B1 | 3/2001 | Winslow |

| Patent | Date | Name |
|---|---|---|
| 6,199,000 B1 | 3/2001 | Keller et al. |
| 6,205,401 B1 | 3/2001 | Pickhard et al. |
| 6,215,828 B1 | 4/2001 | Signell et al. |
| 6,229,479 B1 | 5/2001 | Kozlov et al. |
| 6,230,097 B1 | 5/2001 | Dance et al. |
| 6,233,511 B1 | 5/2001 | Berger et al. |
| 6,236,916 B1 | 5/2001 | Staub et al. |
| 6,236,924 B1 | 5/2001 | Motz |
| 6,253,160 B1 | 6/2001 | Hanseder |
| 6,256,583 B1 | 7/2001 | Sutton |
| 6,259,398 B1 | 7/2001 | Riley |
| 6,266,595 B1 | 7/2001 | Greatline et al. |
| 6,285,320 B1 | 9/2001 | Olster et al. |
| 6,292,132 B1 | 9/2001 | Wilson |
| 6,307,505 B1 | 10/2001 | Green |
| 6,313,788 B1 | 11/2001 | Wilson |
| 6,314,348 B1 | 11/2001 | Winslow |
| 6,325,684 B1 | 12/2001 | Knight |
| 6,336,066 B1 | 1/2002 | Pellenc et al. |
| 6,345,231 B2 | 2/2002 | Quincke |
| 6,356,602 B1 | 3/2002 | Rodal et al. |
| 6,377,889 B1 | 4/2002 | Soest |
| 6,380,888 B1 | 4/2002 | Kucik |
| 6,389,345 B2 | 5/2002 | Phelps |
| 6,392,589 B1 | 5/2002 | Rogers et al. |
| 6,397,147 B1 * | 5/2002 | Whitehead .................. 701/213 |
| 6,415,229 B1 | 7/2002 | Diekhans |
| 6,418,031 B1 | 7/2002 | Archambeault |
| 6,421,003 B1 | 7/2002 | Riley et al. |
| 6,424,915 B1 | 7/2002 | Fukuda et al. |
| 6,431,576 B1 | 8/2002 | Viaud et al. |
| 6,434,462 B1 | 8/2002 | Bevly et al. |
| 6,445,983 B1 | 9/2002 | Dickson et al. |
| 6,445,990 B1 | 9/2002 | Manring |
| 6,449,558 B1 | 9/2002 | Small |
| 6,463,091 B1 | 10/2002 | Zhodzicshsky et al. |
| 6,463,374 B1 | 10/2002 | Keller et al. |
| 6,466,871 B1 | 10/2002 | Reisman et al. |
| 6,469,663 B1 | 10/2002 | Whitehead et al. |
| 6,484,097 B2 | 11/2002 | Fuchs et al. |
| 6,501,422 B1 | 12/2002 | Nichols |
| 6,515,619 B1 | 2/2003 | McKay, Jr. |
| 6,516,271 B2 | 2/2003 | Upadhyaya et al. |
| 6,539,303 B2 | 3/2003 | McClure et al. |
| 6,542,077 B2 | 4/2003 | Joao |
| 6,549,835 B2 | 4/2003 | Deguchi |
| 6,553,299 B1 | 4/2003 | Keller et al. |
| 6,553,300 B2 | 4/2003 | Ma et al. |
| 6,553,311 B2 | 4/2003 | Aheam et al. |
| 6,570,534 B2 | 5/2003 | Cohen et al. |
| 6,577,952 B2 | 6/2003 | Geier et al. |
| 6,587,761 B2 | 7/2003 | Kumar |
| 6,606,542 B2 | 8/2003 | Hauwiller et al. |
| 6,611,228 B2 | 8/2003 | Toda et al. |
| 6,611,754 B2 | 8/2003 | Klein |
| 6,611,755 B1 | 8/2003 | Coffee et al. |
| 6,622,091 B2 | 9/2003 | Perlmutter et al. |
| 6,631,916 B1 | 10/2003 | Miller |
| 6,643,576 B1 | 11/2003 | O'Connor et al. |
| 6,646,603 B2 | 11/2003 | Dooley et al. |
| 6,657,875 B1 | 12/2003 | Zeng et al. |
| 6,671,587 B2 | 12/2003 | Hrovat et al. |
| 6,688,403 B2 | 2/2004 | Bernhardt et al. |
| 6,703,973 B1 | 3/2004 | Nichols |
| 6,704,652 B2 * | 3/2004 | Yi .................. 701/214 |
| 6,711,501 B2 | 3/2004 | McClure et al. |
| 6,721,638 B2 | 4/2004 | Zeitler |
| 6,732,024 B2 | 5/2004 | Rekow et al. |
| 6,744,404 B1 | 6/2004 | Whitehead et al. |
| 6,754,584 B2 | 6/2004 | Pinto et al. |
| 6,774,843 B2 | 8/2004 | Takahashi |
| 6,792,380 B2 | 9/2004 | Toda |
| 6,819,269 B2 | 11/2004 | Flick |
| 6,822,314 B2 | 11/2004 | Beasom |
| 6,865,465 B2 | 3/2005 | McClure |
| 6,865,484 B2 | 3/2005 | Miyasaka et al. |
| 6,900,992 B2 | 5/2005 | Kelly et al. |
| 6,922,635 B2 | 7/2005 | Rorabaugh |
| 6,931,233 B1 | 8/2005 | Tso et al. |
| 6,967,538 B2 | 11/2005 | Woo |
| 6,990,399 B2 | 1/2006 | Hrazdera et al. |
| 7,006,032 B2 | 2/2006 | King et al. |
| 7,026,982 B2 | 4/2006 | Toda et al. |
| 7,027,918 B2 | 4/2006 | Zimmerman et al. |
| 7,031,725 B2 | 4/2006 | Rorabaugh |
| 7,089,099 B2 | 8/2006 | Shostak et al. |
| 7,142,956 B2 | 11/2006 | Heiniger et al. |
| 7,162,348 B2 | 1/2007 | McClure et al. |
| 7,191,061 B2 | 3/2007 | McKay et al. |
| 7,231,290 B2 | 6/2007 | Steichen et al. |
| 7,248,211 B2 | 7/2007 | Hatch et al. |
| 7,271,766 B2 | 9/2007 | Zimmerman et al. |
| 7,277,784 B2 | 10/2007 | Weiss |
| 7,292,186 B2 | 11/2007 | Miller et al. |
| 7,324,915 B2 | 1/2008 | Altman et al. |
| 7,358,896 B2 | 4/2008 | Gradincic et al. |
| 7,373,231 B2 | 5/2008 | McClure et al. |
| 7,388,539 B2 | 6/2008 | Whitehead et al. |
| 7,395,769 B2 | 7/2008 | Jensen |
| 7,428,259 B2 | 9/2008 | Wang et al. |
| 7,437,230 B2 | 10/2008 | McClure et al. |
| 7,451,030 B2 | 11/2008 | Eglington et al. |
| 7,479,900 B2 | 1/2009 | Horstemeyer |
| 7,505,848 B2 | 3/2009 | Flann et al. |
| 7,522,100 B2 | 4/2009 | Yang et al. |
| 7,571,029 B2 | 8/2009 | Dai et al. |
| 7,576,690 B2 * | 8/2009 | Vollath .................. 342/357.24 |
| 7,689,354 B2 | 3/2010 | Heiniger et al. |
| 2003/0014171 A1 | 1/2003 | Ma et al. |
| 2003/0187560 A1 | 10/2003 | Keller et al. |
| 2003/0208319 A1 | 11/2003 | Ell et al. |
| 2004/0039514 A1 | 2/2004 | Steichen et al. |
| 2004/0212533 A1 | 10/2004 | Whitehead et al. |
| 2005/0080559 A1 | 4/2005 | Ishibashi et al. |
| 2005/0225955 A1 | 10/2005 | Grebenkemper et al. |
| 2005/0265494 A1 | 12/2005 | Goodings |
| 2006/0167600 A1 | 7/2006 | Nelson et al. |
| 2006/0215739 A1 | 9/2006 | Williamson et al. |
| 2007/0078570 A1 | 4/2007 | Dai et al. |
| 2007/0088447 A1 | 4/2007 | Stothert et al. |
| 2007/0121708 A1 | 5/2007 | Simpson |
| 2007/0205940 A1 | 9/2007 | Yang et al. |
| 2007/0285308 A1 | 12/2007 | Bauregger et al. |
| 2008/0129586 A1 | 6/2008 | Martin |
| 2008/0204312 A1 | 8/2008 | Euler |
| 2009/0171583 A1 | 7/2009 | DiEsposti |
| 2009/0174597 A1 | 7/2009 | DiLellio et al. |
| 2009/0174622 A1 | 7/2009 | Kanou |
| 2009/0177395 A1 | 7/2009 | Stelpstra |
| 2009/0177399 A1 | 7/2009 | Park et al. |
| 2009/0259397 A1 | 10/2009 | Stanton |
| 2009/0259707 A1 | 10/2009 | Martin et al. |
| 2009/0262014 A1 | 10/2009 | Diesposti |
| 2009/0262018 A1 | 10/2009 | Vasilyev et al. |
| 2009/0262974 A1 | 10/2009 | Lithopoulos |
| 2009/0265054 A1 | 10/2009 | Basnayake |
| 2009/0265101 A1 | 10/2009 | Jow |
| 2009/0265104 A1 | 10/2009 | Shroff |
| 2009/0273372 A1 | 11/2009 | Brenner |
| 2009/0273513 A1 | 11/2009 | Huang |
| 2009/0274079 A1 | 11/2009 | Bhatia et al. |
| 2009/0274113 A1 | 11/2009 | Katz |
| 2009/0276155 A1 | 11/2009 | Jeerage et al. |
| 2009/0295633 A1 | 12/2009 | Pinto et al. |
| 2009/0295634 A1 | 12/2009 | Yu et al. |
| 2009/0299550 A1 | 12/2009 | Baker |
| 2009/0322597 A1 | 12/2009 | Medina Herrero et al. |
| 2009/0322598 A1 | 12/2009 | Fly et al. |
| 2009/0322600 A1 | 12/2009 | Whitehead et al. |
| 2009/0322601 A1 | 12/2009 | Ladd et al. |
| 2009/0322606 A1 | 12/2009 | Gronemeyer |
| 2009/0326809 A1 | 12/2009 | Colley et al. |
| 2010/0013703 A1 | 1/2010 | Tekawy et al. |
| 2010/0026569 A1 | 2/2010 | Amidi |
| 2010/0030470 A1 | 2/2010 | Wang et al. |
| 2010/0039316 A1 | 2/2010 | Gronemeyer et al. |
| 2010/0039318 A1 | 2/2010 | Kmiecik |
| 2010/0039320 A1 | 2/2010 | Boyer et al. |

| | | | |
|---|---|---|---|
| 2010/0039321 A1 | 2/2010 | Abraham | |
| 2010/0060518 A1 | 3/2010 | Bar-Sever et al. | |
| 2010/0063649 A1 | 3/2010 | Wu | |
| 2010/0084147 A1 | 4/2010 | Aral | |
| 2010/0085249 A1 | 4/2010 | Ferguson et al. | |
| 2010/0085253 A1 | 4/2010 | Ferguson et al. | |
| 2010/0103033 A1 | 4/2010 | Roh | |
| 2010/0103034 A1 | 4/2010 | Tobe et al. | |
| 2010/0103038 A1 | 4/2010 | Yeh et al. | |
| 2010/0103040 A1 | 4/2010 | Broadbent | |
| 2010/0106414 A1 | 4/2010 | Whitehead | |
| 2010/0106445 A1 | 4/2010 | Kondoh | |
| 2010/0109944 A1 | 5/2010 | Whitehead et al. | |
| 2010/0109945 A1 | 5/2010 | Roh | |
| 2010/0109947 A1 | 5/2010 | Rintanen | |
| 2010/0109948 A1 | 5/2010 | Razoumov et al. | |
| 2010/0109950 A1 | 5/2010 | Roh | |
| 2010/0111372 A1 | 5/2010 | Zheng et al. | |
| 2010/0114483 A1 | 5/2010 | Heo et al. | |
| 2010/0117894 A1 | 5/2010 | Velde et al. | |

FOREIGN PATENT DOCUMENTS

| | | | |
|---|---|---|---|
| JP | 11072549 | * | 3/1999 |
| WO | WO9836288 | | 8/1998 |
| WO | WO0024239 | | 5/2000 |
| WO | WO03019430 | | 3/2003 |
| WO | WO2005/119386 | | 12/2005 |
| WO | WO2009/066183 | | 5/2009 |
| WO | WO2009126587 | | 10/2009 |
| WO | WO2009/148638 | | 12/2009 |

OTHER PUBLICATIONS

"Orthman Manufacturing Co., www.orthnnan.com/htm;guidance. htm", 2004, regarding the "Tracer Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers vol. 1, Monetrey, California American Institute of Aeronautics and Astronautics, Inc.*, (May 2004),136-143.

Xu, Jiangning et al., "An EHW Architecture for Real-Time GPS Attitude Determination Based on Parallel Genetic Algorithm" *The Computer SocietyProceedings of the 2002 NASA/DOD Conference on Evolvable Hardware* (EH'02), (2002).

Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc.

Park, Chansik et al., "Integer Ambiguity Resolution for GPS Based Attitude Determination System", *SICE 1998*, Jul. 29-31, Chiba, 1115-1120.

Last, J. D., et al., "Effect of skywave interference on coverage of radiobeacon DGPS stations", *IEEE Proc.-Radar, Sonar Navig.*, vol. 144, No. 3, Jun. 1997, pp. 163-168.

"International Search Report and Written Opinion", PCT/US2004/015678, filed May 17, 2004, Jun. 21, 2005.

"ISO", *11783 Part 7 Draft Amendment 1 Annex*, Paragraphs B.6 and B.7.ISO 11783-7 2004 DAM1, ISO: Mar. 8 2004.

Kaplan, E D., "Understanding GPS: Principles and Applications", *Artech House*, MA, 1996.

Irsigler, M et al., "PPL Tracking Performance in the Presence of Oscillator Phase Noise", *GPS Solutions*, vol. 5, No. 4, pp. 45-57 (2002).

Ward, Phillip W., "Performance Comparisons Between FLL, PLL and a Novel FLL-Assisted-PLL Carrier Tracking Loop Under RF Interference Conditions", *11th Int. Tech Meeting of the Satellite Division of the U.S. Inst. of Navigation*, Nashville, TN, Sep. 15-18, 783-795, 1998.

Bevly, David M., "Comparison of INS v. Carrier-Phase DGPS for Attitude Determination in the Control of Off-Road Vehicles" *ION 55th Annual Meeting*; Jun. 28-30, 1999; Cambridge, Massachusetts; pp. 497-504.

Keicher, R. et al., "Automatic Guidance for Agricultural Vehicles in Europe", *Computers and Electronics in Agriculture*, vol. 25, (Jan. 2000),169-194.

"International Search Report", PCT/US09/49776, (Aug. 11, 2009).

"International Search Report", PCT/AU/2008/000002, (Feb. 28, 2008).

"International Search Report", PCT/US09/33693, (Mar. 30, 2009).

"International Search Report", PCT/US09/039686, (May 26, 2009).

"International Search Report,", PCT/US09/34376, (Nov. 2, 2009).

"International Search Report", PCT/US09/33567, (Feb. 9, 2009).

"International Search Report and Written Opinion", PCT/IB2008/003796,, (Jul. 15, 2009).

"International Search Report / Written Opinion", PCT/US09/63594.

"International Search Report", PCT/US09/60668.

"International Search Report and Written Opinion", PCT/US10/21334.

"International Search Report", PCT/US09/067693, (Jan. 26, 2010).

Rho, Hyundho et al., "Dual-Frequency GPS Precise Point Positioning with WADGPS Corrections", [retrieved on May 18, 2010]. Retrieved from the Internet: ,URL: http://gauss.gge.unb.ca/papers.pdf/iongnss2005.rho.wadgps.pdf. (Jul. 12, 2006).

"EUROCONTROL, PEGASUS Technical Notes on SBAS", report [online], Dec. 7, 2004 [retrieved on May 18, 2010]. Retrieved from the Internet: <URL: http://www.icao.int/icao/en/ro/nacc/meetings/2004/gnss/documentation/Pegasus/tn.pdf>, (Dec. 7, 2004), p. 89 paras [0001]-[0004].

"ARINC Engineering Services, Interface Specification IS-GPS-200, Revision D", Online [retrieved on May 18, 2010]. Retrieved from the Internet:<URL: http://www.navcen.uscg.gov/gps/geninfo/IS-GPS-200D.pdf>, (Dec. 7, 2004), p. 168 para [0001].

Schaer, et al., "Determination and Use of GPS Differential Code Bias Values", Presentation [online]. Revtrieved May 18, 2010. Retrieved from the Internet: <http://nng/esoc.esa.de/ws2006/REPR2.pdf>. (May 8, 2006).

"International Search Report", PCT/US10/26509, (Apr. 20, 2010).

Takac, Frank et al., "SmartRTK: A Novel Method of Processing Standardised RTCM Network RTK Information for High Precision Positioning", *Proceedings of ENC GNSS 2008*, Toulouse, France,(Apr. 22, 2008).

* cited by examiner

SYSTEM AND METHOD FOR AUGMENTING DGNSS WITH INTERNALLY-GENERATED DIFFERENTIAL CORRECTION

BACKGROUND OF THE INVENTION

1. Field of the Invention

The invention relates generally to methods for processing signals received from satellites within a Global Navigation Satellite System (GNSS) for example, Global Positioning System (GPS) receivers, and more particularly to a method for computing precise relative locations using differential GNSS/GPS techniques for all observations measured by a rover GNSS receiver, and not just those observations that are common to base and rover GNSS receivers.

2. Description of the Related Art

Evolution of GPS-only systems to a multi-constellation Global Navigation Satellite System (GNSS) employing GPS, GLONASS, Galileo, Compass and others has become a reality. This has a number of implications when it comes to differential-based positioning (commonly called DGPS or DGNSS), particularly when it comes to mixing legacy equipment with newer equipment, or when equipment is not compatible with respect to the types of GNSS signals measured and processed.

Differential GPS/GNSS techniques have been successfully applied for a number of years. These techniques, for example, enable accurate real-time positioning of a rover receiver relative to a base receiver. This positioning includes code-only or carrier-smoothed-code differential techniques that result in sub-meter accuracy, such as those employed while operating with older RTCM 104 messages. They include carrier phase based techniques that facilitate centimeter-level real-time kinematic (RTK) positioning and employ single- or double- or even triple-differencing. Differential GPS is also the underlying technology behind Satellite-Based-Augmentation-Systems (SBAS) such as the FAA's Wide Area Augmentation System (WAAS) system as well as commercial Wide Area Differential (WADGPS) services such as those provided by OmniStar.

Differential GNSS (DGNSS), as its name implies, requires that data be differenced. One of the most useful differences in DGNSS, and therefore a widely used difference, is that of differencing two similar observations of a satellite ranging signal where one observation is made at a base GNSS receiver and another is made at a rover GNSS receiver. This type of difference, commonly referred to as the single-difference, removes common-mode errors (i.e. errors seen by both base and rover receivers) such as satellite orbit errors, satellite clock errors, and atmospheric errors that arise as the signal passes through the ionosphere and the troposphere. The remaining sources of error that result when employing single-difference techniques are those that are unique to the receiver, such as receiver noise and multipath. These remaining errors are often small in comparison to the common-mode errors, especially when carrier-phase observations are employed.

As is commonly understood, the use of a "differential corrector" is really just a form of single differencing where differencing happens implicitly as the differential correction is applied at the rover. In the case of WADGPS, data from a multitude of base receivers are processed together to form differential corrections, or constituents thereof, tailored to a particular rover location. The WADGPS SBAS systems that are prevalent today send data that are used to construct differential correctors, rather than the correctors themselves.

It is well known that there are advantages to processing signals from multiple constellations of a Global Navigation Satellite System (GNSS), including GLONASS, Galileo, and Compass signals, as opposed to processing GPS-only signals. The advantages are particularly related to increased numbers of observations which improve robustness, accuracy, and speed of ambiguity convergence. As such, the gradual migration from GPS-only to multi-GNSS capability has created a need for dealing with the wide variety of signals arriving from different satellite constellations. Different types of receivers will have different capabilities as far as their ability to track and process the multitude of GNSS signals. In a differential GNSS application, variations in receiver capability between base and rover may result in the inability to use all signals available for lack of appropriate matching pairs of observations. This situation is more likely when mixing different grades of receivers, receivers from different manufacturers, or older GPS-only receivers with newer GNSS receivers.

Take, for example, a system comprising a dual-frequency GPS base receiver that sends RTCM Version 3 code and carrier observations for the L1 and L2 GPS ranging signals to a rover GPS/GLONASS receiver. The rover measures code and carrier phase not only from GPS L1 and L2, but also GLONASS L1 and L2 signals. Prior to this invention, the rover, when performing differential positioning, could only use its GPS observations since GLONASS observations are of little use without matching observations from the base. This is actually a common problem since many RTK base stations are GPS-only, having been deployed before the recent shift towards GLONASS capability that has transpired as a result of the Soviet Union restoring GLONASS to full operational capability. And the net result is that the advantages that the added GLONASS satellites offer towards computing a robust, cycle-slip free location or solving RTK ambiguities cannot be realized.

Another example would be the use of a dual-frequency (L1/L2) GPS rover receiver with a single-frequency (L1) GPS base station. It is well known that dual-frequency RTK methods result in much quicker integer ambiguity resolution than single-frequency methods and are thus more desirable. A farmer, for example, using a GPS guided vehicle for precise planting of crops does not want to wait five to ten minutes after driving the vehicle under a tree to re-acquire RTK and continue planting. But this is often the case with single-frequency RTK. If the GPS base deployed in this scenario transmits only single-frequency L1 observations (or corrections), the dual-frequency rover on the tractor must, prior to this invention, rely only on single frequency RTK methods and essentially discard its L2 observations and its ability to do quick (or instant) ambiguity solutions.

Another situation is that of mixing GLONASS observations from different manufacturers' equipment, including receivers and antennas. It is well known that the Frequency Division Multiple Access (FDMA) methods of GLONASS are subject to frequency-dependent group delays and that these group-delays vary for different types of receivers and antennas due to variations in circuit design and design components. In RTK, these group-delays cannot be ignored, as they cause carrier phase errors at the centimeter-level or more. Group delays are not an issue when processing CDMA signals such as those from the GPS, Galileo or Compass systems since these signals are grouped into sets that share a common frequency and therefore exhibit a common group-delay. The common group-delay appears simply as receiver clock error for a given frequency of signal. Thus, to overcome the receiver and satellite-dependent group delay problem of GLONASS, one manufacturer's rover GNSS receiver may choose to ignore the GLONASS observations from a different manufacturer's base GNSS receiver, resulting in the same disadvantages as if the base did not provide GLONASS observations at all.

Yet another example occurs with a WADGPS system, such as the FAA's Wide Area Augmentation System (WAAS), when a receiver operates partially outside the coverage area. In this situation, differential correctors may be available for some satellites in view, but not all satellites. Using only satellites for which differential is available results in a higher Dilution of Precision (DOP). Consequently, the solution is more likely to suffer sudden loss of accuracy if one of the satellites critical to maintaining a lower DOP is suddenly blocked. Clearly, it is desirable to form a solution having the mathematical strength of all satellites in view when operating around objects that might block satellite signal reception as opposed to a solution that utilizes only the satellites for which differential is available.

To make the aforementioned problems worse, some GNSS receivers will mirror the use of velocity observations with the use of code or carrier phase ranging observations. That is, if the rover lacks base range observations to perform differencing on a particular channel, it ignores all observations on that channel, including velocity-related observations such as Doppler and delta-carrier phase. By ignoring velocity observations, the GNSS receiver is essentially penalizing itself twice for the lack of matching base-rover observation sets.

The methods of U.S. Pat. No. 6,397,147, which is assigned to a common assignee and is incorporated herein by reference, provide a unique and useful approach to compute differential corrections when there is no base station present. Briefly, the GNSS receiver first operates as a base station, computing differential correction terms, and then acts as a rover, using these correction terms. The problem with the approach, however, is that the user is forced to return occasionally to a place of calibration to re-calibrate the differential corrections; or else the user must be willing to live with a drift in the computed location estimate that arises when differential is not re-calibrated, or is calibrated using a non-precisely known location, such as its current location.

What is needed then is a system and method designed to take advantage of having a partial set of differential correction terms available rather than a complete lack of differential correction terms. Specifically, it is desired to have a method to take full advantage of the well-known differential GNSS approaches deployed today, but then gain the added benefit of the DGNSS methods disclosed in U.S. Pat. No. 6,397,147 when dealing with observations for which differences cannot be formed, as for example when experiencing a lack of commonality for some, but not all, base and rover observations.

An object of this invention is to provide such a method. This method allows all observations to be incorporated into a differential GNSS solution, not just those common to the base and the rover. A further object is to provide additional differentially corrected observations that can potentially reduce the time required to solve integer ambiguities, especially when recovering from a momentary loss of RTK. It is further object to provide extra observations so as to improve the performance of methods that use redundancy of observations to detect cycle slips in GNSS carrier phase observations. Yet another object of this invention is to provide a set of differential correctors that is locally generated in the rover receiver using the rover's own phase observations, with the correctors being referenced to the rover's, rather than the base', location. Such differential is effectively zero-baseline differential and is thus insensitive to atmospheric variations seen across long baselines when used for such purposes as re-acquiring ambiguity lock. It is a further object of the invention to provide differential that can bypass the effects of receiver-dependent, group-delay variations.

SUMMARY OF THE INVENTION

In the practice of the present invention, a rover receiver first utilizes data from a base receiver, a DGNSS reference network, or some other differential source to compute a differentially corrected location. Then, using this location and data observed only at the rover, the rover computes an internal set of differential corrections, which set is stored in computer memory, updated as necessary, and applied in future times to correct observations taken by the rover. The possibly mobile rover receiver, therefore, corrects its own observations with differential corrections computed from its own past observations; relying on external differential for the sole purpose of establishing a reference location.

In prior art DGPS/DGNSS, a stationary base receiver uses its known location as a reference for computing differential corrections that correct errors in its own phase observations, and these corrections are then supplied over a communication link to a rover to correct similar errors seen at the rover. Alternatively, the base supplies, over the communication link to the rover, its reference location and phase observations so that the rover can compute the differential corrections itself, or take a mathematically equivalent approach of forming single-differences between base and rover observations.

In this invention, the rover actually acts like a base, using its own dynamic location rather than the base's static location to compute differential corrections for its own ranging code and/or carrier observations. The rover's dynamic location is updated continuously using differential from the base and is effectively "tied" to the base's location—having been established using base differentially-corrected observables. For example, an offset in the base' location estimate will cause a similar offset in the rover's location estimate and both rover and base will agree on the same location when placed on top of one another. Differential computed using the rover's own observations and location estimate will have agreement with differential computed using the base' observations as far as positioning is concerned. That is, differential should be nearly identical other than some minor effects due to inaccuracies of location and atmospheric differences over the baseline. One advantage, however, of using the rover location and rover observations is that the set of differential corrections can be extended to include all satellites seen at the rover, not just those that are common to the base and rover.

This means that integer ambiguity solutions are possible using all satellites in view of the rover receiver, not just the satellites which are seen at the base station. For example, with the present invention, a rover receiver can perform an RTK ambiguity solution using GLONASS carrier phase without external carrier phase correctors supplied for GLONASS satellites by the base. Instead, the GLONASS carrier phase corrections are calculated internally by the rover using its own GLONASS data.

Corrections generated at the rover using the rover's own observations and dynamic location will be referred to as "internal corrections." These internal corrections are computed at one instant of time and utilized at a future instant of time as the need arises. Such needs include compensating for loss of satellites, solving integer ambiguities, detecting cycle slips, removing atmospheric or group-delay biases, or generally improving robustness.

Corrections generated using conventional differential techniques where rover observations are corrected using observations from the base will be referred to as "standard corrections." The invention allows for a use of a mixture of both standard and internal corrections.

The internal corrections are not over-utilized, and in non-critical times, the method falls back to performing the navigation solution primarily using observations that can be corrected with the standard base corrections. Advantageously, when conditions are such that suitable performance is achieved using the standard base corrections, the internal observations are de-weighted so that the standard base-corrected observations dominate the least-squares or Kalman filter solution. This avoids a positive-feedback scenario where errors in location propagate into errors in internal differential, which then propagate into future errors in location. Although the internally corrected observations are de-weighted during normal operation, the weighting may be increased as the need arises, such as during times of signal blockages, particularly when those blockages result in loss of observations. Without preventive measures such as de-weighting from the solution, using only as needed, or using in a manner that does not affect location accuracy, it is possible that any error that enters into the system will remain in the system and potentially grow cumulatively as additional errors are accrued later on.

In a preferred embodiment, the internally generated corrections are used without restriction in situations for which the additional observations give added advantage, but for which their use is not directly coupled to rover location accuracy and thus, no potential exists for feedback of location error into the correction generation process. In particular, such uses include RAIM-like cycle slip monitoring and ambiguity resolution.

The internally generated corrections are computed only when certain conditions are met. At a minimum, the rovers' location estimate should have reached a desired level of accuracy. In an RTK application, this typically means that the rover is in true RTK mode with integers fixed. Another condition is that of stable signal tracking, (e.g., no recent cycle-slips) for any observation for which a correction is to be generated. When the above conditions are not met, the existing internally generated corrections are kept valid for a period of time by performing updates to account for changes in modeled atmospheric induced delays, changes in broadcast orbit and clock models, and changes in other predictable components of the corrections. The approach of keeping corrections updated over a period of time is referred to here as "coasting." The ability to coast is important since the internal corrections will most likely be needed during times that are not ripe for their generation. Useful life can be extended only so long since coasting takes into account only the predictable nature of change. Unpredictable effects, such as un-modeled atmospheric errors and un-modeled satellite clock errors limit useful life. How long corrections will last depends on the required accuracy of the application. In RTK applications, useful life is typically 15 to 60 seconds.

In summary, the invention provides a means to use all observations available at a rover in a differential GNSS solution by internally correcting these observations relative to a rover location that is itself relative to a base location. By doing so, all observations can be used, not just those that are common to both base and rover. Standard base-rover differential positioning of the rover is still needed to produce a location that serves as a reference when computing the internal corrections. A reference location computed as such will result in consistency of the internal corrections with the standard corrections in that they both agree on the same location in a differential solution.

It must be pointed out that a base GNSS receiver is one source of standard differential corrections, or more generally, differential enabling data. However, there are other sources of differential enabling data that fit this application. These include data that are available through use of Wide Area DGNSS networks, SBAS satellite broadcast and subscription-based differential services.

BRIEF DESCRIPTION OF THE DRAWINGS

FIG. 4A shows that three differential correction curves exhibit a common clock characteristic which is not well modeled in one curve when coasting.

FIG. 4B shows that three differential correction curves exhibit a common clock characteristic which is well modeled when coasting.

DETAILED DESCRIPTION OF THE PREFERRED EMBODIMENTS

In the most common form, Differential GNSS (DGNSS) requires two GNSS receivers, a rover and a base receiver. The base is typically stationary at a known location and sends to a rover GNSS receiver phase (or pseudo-range) observations plus its known location, or in lieu of this, differential correctors or other differential enabling data. The rover takes the data from the base, and uses it to correct its own observations to increase their accuracy. The result is that the rover can provide a more accurate location using corrected observations, even to the centimeter level or less when carrier phase is used in an RTK solution.

Figure 1A:
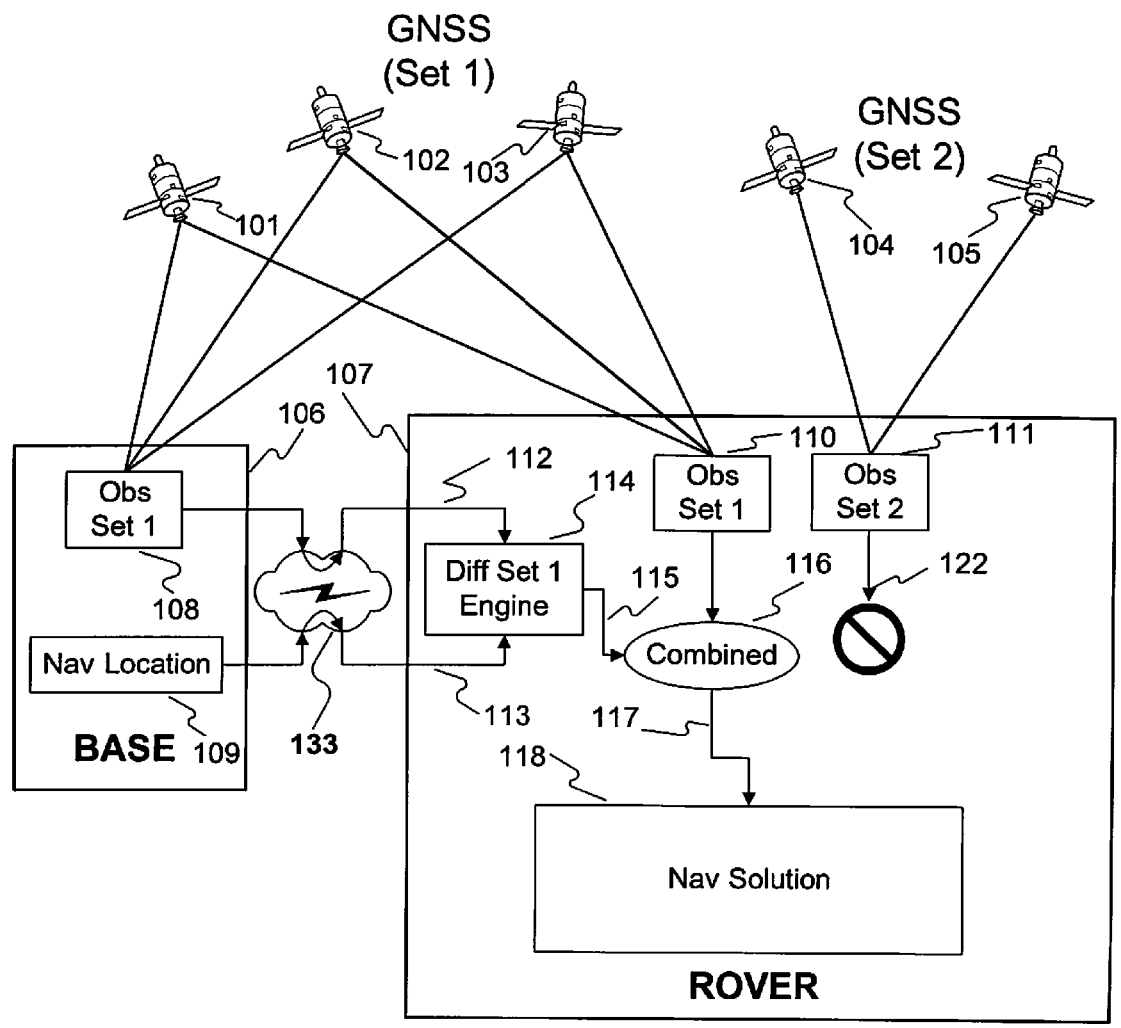
FIG. 1A is a schematic of a differential GNSS (DGNSS) application where one set of satellite information is measured at a base receiver and two sets of satellite information are measured at a rover receiver, the second set not being used due to lack of a corresponding set of information from the base.

FIG. 1A shows the details of a typical DGNSS scenario with two sets of satellites involved. The sets could be from different GNSS constellations such as GPS and GLONASS, or simply one set that is observable to both receivers while the other set is observable only to the rover. As shown in FIG. 1A, satellite Set 1 is comprised of satellites 101, 102, and 103 while satellite set 2 is comprised of satellites 104 and 105. The base 106 receives signals from satellite Set 1, and computes observables of code phase, carrier phase, carrier velocity, and possibly other quantities related to the phase and phase-derivatives of the Set 1 signals that are tracked. The observables 108 are denoted "Obs Set 1", since they are derived form tracking the phases of signals arriving from satellite Set 1. A Nav Location 109 also resides within the base receiver and may be manually entered as a "known location" or computed automatically by the base.

The observables 108 and the Nay Location 109 are transmitted from the base to the rover 107 over a communication link 133. In another embodiment, it may be differential correctors or differential enabling data, rather than observables that are transmitted. The rover receives the transmitted observables 112 and location 113 and delivers them to a differential computation engine 114. Within this engine, well known techniques are used to compute differential corrections, where an observed range is differenced with a "truth" range to compute a differential correction that, when added back to the observed range, will correct any measurement errors. The "truth" range is computed as the distance between a "known" location (the reference location) of the base and the satellite's location determined from orbit model parameters. Such corrections will correct not only the observables measured at the base, but the rover as well when sufficiently close to the base (typically within the 10 to 100 mile range). When close, the rover will see errors similar to those seen at the base and hence the differential corrections are valid at the rover as well. Such base-transmitted differential correction data is generally designated "standard corrections" or "standard correctors."

Similar to the base, the rover GNSS receiver 107 also makes observations of code and carrier phase for signals arriving from satellite Set 1. Unlike the base 106, the rover 107 has the added ability to make observations for satellite Set 2. For example, it may have capability of tracking Set 2 whereas the base may not. Or, the base may actually track Set 2, but choose not to send observations for Set 2 over the communication link 133. The observations 110 and 111 corresponding to Set 1 and Set 2 signals are denoted "Obs Set 1" and "Obs Set 2" respectively. Since the rover has differential correctors available only for the Set 1 observations, it may correct only to the Set 1 observations. The "standard" corrections 115 are added to the Set 1 observations 110 at summer 116. The corrected Set 1 observations 117 are then fed into the Navigation Solution Computational Engine 118, where a location is computed. This location computation may involve RTK ambiguity resolution, double differencing, single differencing, Kalman filtering, and other well known methods of GNSS location determination. Since the base does not make observations for the Set 2 satellites, differential correctors are not available for these satellites. Hence the observations 111 from Obs Set 2 in the rover cannot be used and are rejected (or ignored) as indicated at 122 since they are not corrected and will thus degrade performance or accuracy when used in a DGNSS application.

Figure 1B:
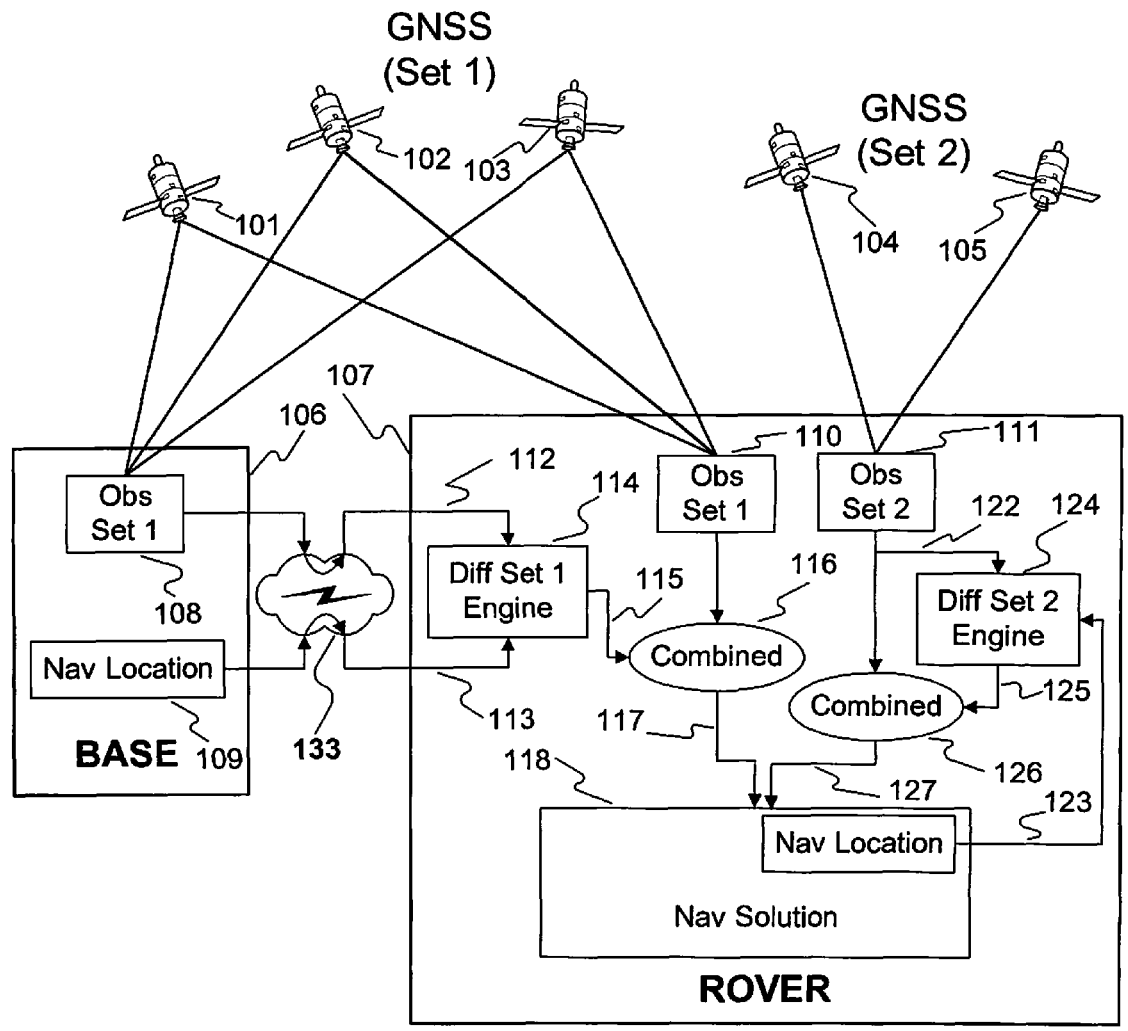
FIG. 1B is a schematic of a differential GNSS application of the present invention. Here, one set of satellite information is measured at a base receiver and two sets of satellite information are measured at a rover receiver, both of which are used, one set being differentially corrected using methods of the present invention.

FIG. 1B shows an embodiment of this invention. FIG. 1B is similar to FIG. 1A except that it shows the added capability to differentially correct, and therefore use the Obs Set 2 observations. This is a unique and novel feature of this invention. The observations 122 from Obs Set 2 are now fed into a "Diff Set 2" differential computation engine 124. This computation also makes use of a location, but the location is that of the rover, not the base as the case with classical DGNSS prior art methods. This internally generated differential (i.e. "internal corrections" versus "standard corrections") is computed using methods that are similar to those used to compute the standard differential in prior art as is done for Satellite Set 1. Briefly, an observed range is differenced with a "truth" range to form a differential correction that, when added back to the observed range, will correct any measurement errors. This internal correction, however, will "internally" (to the rover 107) correct the observed errors seen at the rover, as opposed to observed errors seen at the base as in conventional DGNSS of prior art. This is an advantage since atmosphere-induced, spatially dependant error components that differ between rover and base, especially over long baselines, will not be present. This again, is unlike conventional DGNSS. In practice, atmospheric errors may be implicitly present, however, since such errors may exist in the Obs Set 1 corrections upon which the accuracy of the rover's location estimate depends. And the rover location estimate is the reference for computing the Obs Set 2 differential, thereby implicitly impacting Obs Set 2 differential accuracy. But to the extent that the estimation of rover location provides an averaging of such errors (or canceling effect, such as when using ionosphere-free combinations), the impact of atmospheric delay variations may be attenuated or nearly eliminated.

The Diff Set 2 differential 125 is then added back to the Obs Set 2 observations at summer 126, and the corrected Obs Set 2 observations 127 are fed into the Navigation Solution Engine 118, along with the corrected Obs Set 1 observations 117. Hence, with the inclusion of Obs Set 2, there are more observations available, giving well known advantages in RTK ambiguity resolution, cycle slip detection, and general robustness.

In a preferred embodiment, the corrected Obs Set 2 observations are de-weighted from the location estimate computation (by Kalman Filter, Weighted Least Squares or other means) during times when there is good availability of Obs Set 1 observations. Or they may not even be used at all for location computations during such times. This practice avoids a positive-feedback scenario where errors in the rover's location estimate propagate into errors in the Set 2 differential correctors, which then cause an additional increase in the rover's location estimation error, and so on.

Also, in a preferred embodiment, the differential correctors for Obs Set 2 are computed only during times of high availability of Obs Set 1 observations (and good satellite geometry) and hence times of high estimation accuracy in the rover's location. In an RTK application, Obs Set 2 corrections are computed only after RTK lock has been established to assure that they are accurate to near centimeter level and thus can be applied in future RTK computations. The Obs Set 1 differential correctors are computed following the completion of the location estimation process to assure that location has been estimated to the best accuracy possible for the epoch.

The Diff Set 2 differential corrections are applied after their time-of-computation; up to several minutes if proper care is taken. What this means is that if portions of the Set 1 observations are suddenly not available, or otherwise compromised, perhaps due to blockages of signals while driving under a tree, differentially corrected Set 2 observations can be utilized to help maintain the integrity of the location estimation. The addition of Obs Set 2 observations in the DGNSS application can help: 1) make up for losses in Dilution of Precision (DOP); 2) aid in cycle slip detection; 3) aid in ambiguity resolution should ambiguities need to be reacquired; and, more generically, 4) be applied whenever it is advantageous to have additional observations. Thus, even though the Obs Set 2 observations are not corrected by conventional DGNSS means, they are still corrected and can be applied as if they are conventional DGNSS corrected observations in some of the more crucial situations, such as reacquiring ambiguities.

Figure 2:
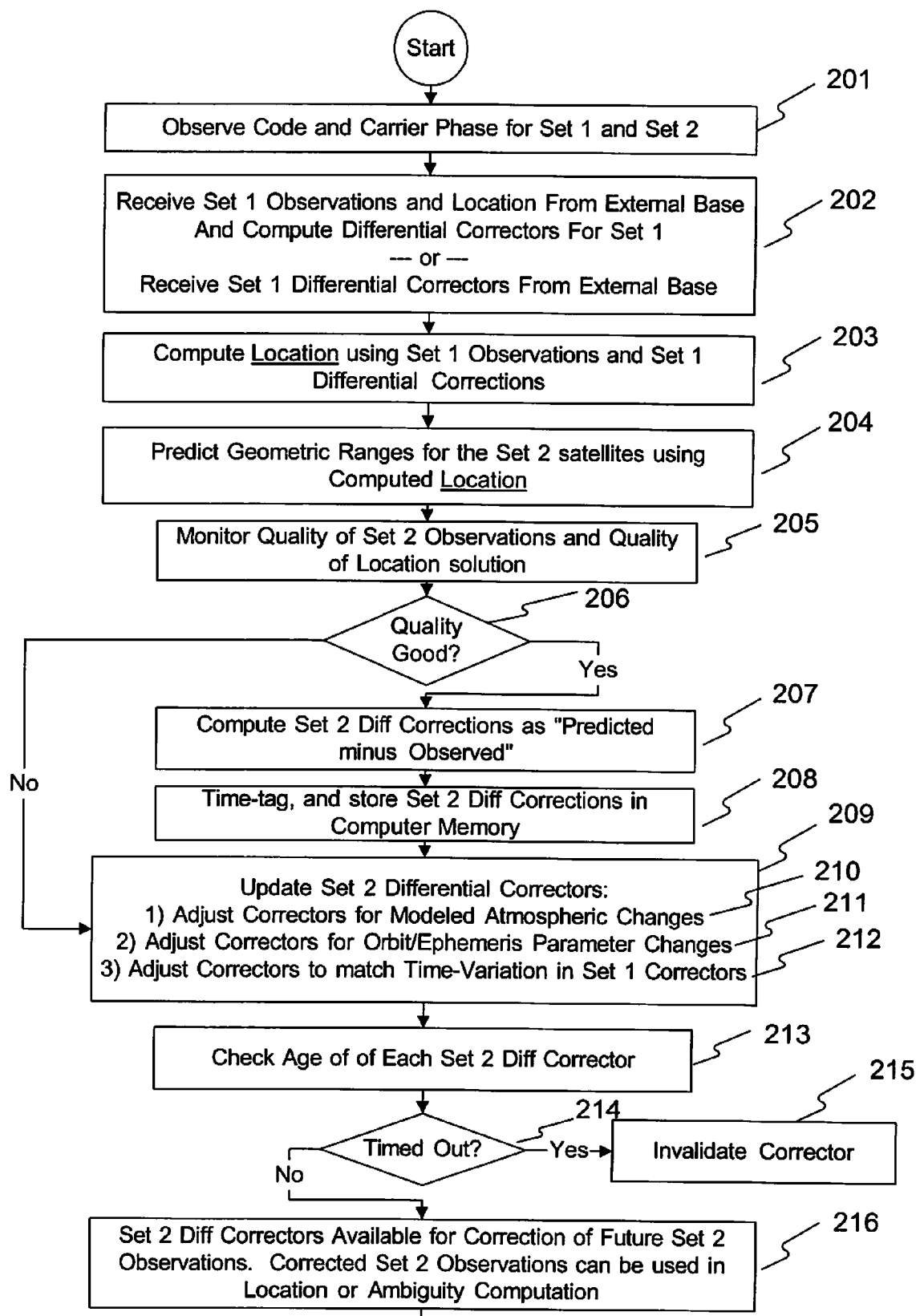
FIG. 2 is a flow chart showing the process flow of the present invention.

FIG. 2 shows a process flow chart of the invention as it applies to the rover 107. Code phase, carrier phase, and possibly other observations are made for Obs Set 1 and Obs Set 2 GNSS signals as depicted in step 201. In step 202, differential corrections for Obs Set 1 become available. The source of these corrections could be a base GNSS receiver, an SBAS satellite broadcast, a wide area differential system, a subscription differential service, or other such equivalent sources. In some situations, differential is received directly from the source, i.e. the external base 106. In others, differential is computed in the rover 107, as for example when computing differential using observations and a location received from a base receiver 106 over RTCM-3, CMR, or other protocol.

In step 203, the rover's location is computed, using the Set 1 differentially corrected observations 117 and possibly de-weighted Set 2 differentially corrected observations 127. The Set 2 observations are de-weighted or not used to avoid accumulation of errors that may arise when repeatedly computing a location using differential corrections based on a previously computed location (the positive-feedback scenario mentioned previously).

Using the location from Step 203, the geometric ranges to the Set 2 satellites are computed in step 204. It is important to have sufficient accuracy of the location of the rover relative to the base. The level of accuracy is dictated by the application. A location quality check is found in step 205. In an RTK application, the location should be of RTK quality (cm level accuracy) before proceeding to compute Set 2 differential. In other words, the Set 1 ambiguities should be fixed to their integer values and the receiver location should be estimated based upon the ambiguity-corrected carrier phase. There is little point in computing differential (Diff Set 2) for Obs Set 2 observables if this differential cannot be made to the accuracy of RTK since this differential (Diff Set 2) will ultimately be used to supplement RTK positioning or to help reestablish ambiguities after drop from RTK due to blockages.

In addition to the check on accuracy of location, the individual quality of each Obs Set 2 observation is also checked in step 205. Obs Set 2 observation quality is monitored for possible cycle slips and other problems that would impact the quality of the Set 2 differentially corrected data 127. A branch based on the quality check is made at decision point 206. If either location accuracy or observation quality fails the test, the process skips to step 209

In step 207, the Diff Set 2 differential is computed for each Obs Set 2 observation that passes the quality check. In step 208, the differential corrections 125 from the Diff Set 2 engine 124 are time-tagged, and stored in computer memory for future use.

In step 209, differential correctors are kept updated to account for various changes that can occur as the differential ages. This step is particularly important when the differential has not been recently computed due to a quality failure at 206. There are three adjustments shown that may be necessary. The first adjustment 210 is an adjustment to account for changes in atmosphere-induced delays that have occurred since the differential was last computed. Methods of accounting for such atmospheric effects are disclosed in U.S. Pat. No. 6,397,147. The discussion on the magnitude of such errors as they relate to satellite elevation is found later on in this disclosure.

The second possible adjustment 211, which may occur while keeping the differential updated, is accounting for parameter changes in the broadcast Orbit model (or Ephemeris) and the broadcast satellite clock model. Changes in parameters occur on a periodic basis as the GNSS satellite updates its navigation message content with new prediction data. Differential correctors compensate for errors in the orbit and clock broadcast models. When the broadcast models change, the differential corrections must change accordingly.

A third adjustment 212, that may or may not take place depending on the nature of the Diff Set 1 differential 115, is to assure that the Diff Set 2 differential 125 stays consistent with any common-mode clock variation seen in the Diff Set 1 differential 115. When computing Diff Set 1 differential, errors in estimating the base' clock will translate into a common-mode error seen in all Diff Set 1 differential 115. If a clock-induced wander exists in the Set 1 differential 115, a similar wander should be imposed on the Set 2 differential 125 to extend its useful life without forcing the navigation solution 118 to estimate additional clock components. This task is not necessary, or is trivial, if proper care is taken when computing the Set 1 differential 115 so as to remove any significant receiver clock contributions. For example, a double-difference approach to eliminating receiver clock dependence can be deployed where one reference observation from Set 1 is used to difference away clock errors in other observations. More details on all three types of adjustments to the Set 2 differential will follow in later paragraphs.

Due to the fact that there are some components in differential that drift over time in a manner that is not fully predictable, it is necessary to impose a limit on the life of the differential as shown in step 213. The age at which differential times-out may depend on multiple factors, but a significant indicator as to useful life is the satellite elevation angle. Satellites at lower elevation angle have: 1) higher levels of multipath noise which may change rapidly over time and thus not cancel in future application of the differential; and 2) higher levels of atmospheric effects that may be difficult to reliably predict. Hence, in a preferred embodiment, the timeout will be a function of satellite elevation angle. Also, the level of accuracy that the differential is to provide when applied to correct observations will also contribute to the choice of timeout period. Levels of accuracy below several centimeters may dictate a maximum timeout of 30 seconds whereas decimeter-level accuracy may allow several minutes to elapse before timeout. The timeout conditions should be derived by observing accuracy versus age-of-differential while processing real signals in scenarios typical of the planned GNSS receiver usage.

The final step, 216, is to actually use the Diff Set 2 differential corrections 125 to correct the Obs Set 2 observations 122. The Diff Set 2 differential corrections are applied at an epoch that is in the future relative to the epoch in which the corrections are computed. As mentioned, differentially corrected Obs Set 2 observations may aid navigation algorithms in a number of ways, including reacquiring ambiguities after momentary signal blockage or for improving robustness by compensating for occasional loss of Obs Set 1 observations.

Figure 3:
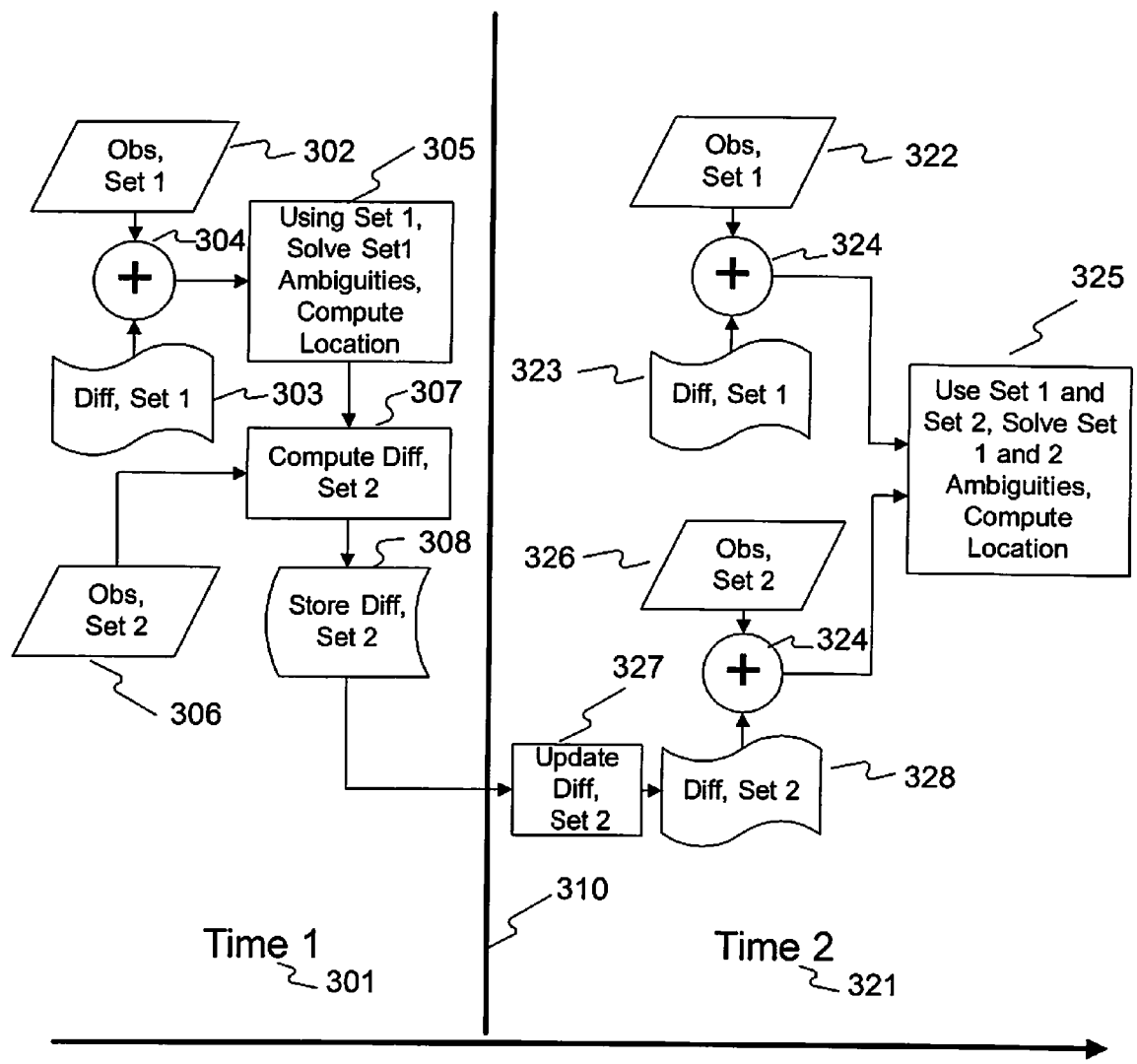
FIG. 3 is a chart showing how the process is distributed across time.

FIG. 3 elaborates more on the fact that Diff Set 2 differential is computed at one epoch, but then applied in a subsequent epoch. Two time epochs, 301 and 321, are shown with a line 310 separating them. In the first epoch 301, Set 1 satellite observations (Obs) Set 1, designated 302, are added to Diff Set 1 differential 303 at summer 304. The resulting differentially corrected Obs Set 1 observations are fed into the Navigation Engine 305 where a location is estimated. The location for 305 and Obs Set 2 observations 306 are delivered to the process 307 that computes the Diff Set 2 differential, which is stored for later use. The Diff Set 2 differential is not used during the Time 1 epoch 301.

At a subsequent Time 2 epoch 321 the process of delivering Diff Set 1 differentially corrected observations 323 repeats in a similar manner to that of the first epoch. The utilization of the Diff Set 1 differential corrections is shown by blocks 322, 323 and 324. In the Time 1 first epoch 301 the Diff Set 2 differential is stored at 308, and in the Time 2 later epoch 321 the Diff Set 2 differential 328 is available for use. An update to differential takes place as outlined in block 209 of FIG. 2 and this update is shown in block 327. Diff Set 2 differential 328 is then summed at summer 324 with the Obs Set 2 observations 326. Both the Set 1 and Set 2 differentially corrected observations are now delivered from summers 324 to the Navigation Engine 325. The Obs Set 2 observations may not be used or may be de-weighted from the navigation solution unless needed to make up for loss of Set 1 observations or to recover from loss of RTK ambiguity fix. Although not shown, differential for the Obs Set 2 observations may again be computed at epoch 321 and stored for future use.

To better understand the nature of differential as it applies to this invention, it is necessary to provide some background derivations. Additional information can be found in the literature and in U.S. Pat. No. 6,397,147. For a given GNSS satellite, the differential correctors may be computed from the following (or similar) equations:

$$\text{Differential}(t_k) = [R_{geometric,est}(t_k) + T_{sv,est}(t_k) + T_{rcvr,est}(t_k)] - R_{measured}(t_k) \tag{1}$$

$$R_{geometric,est}(t_k) = \|\vec{r}_{sv,est}(t_k) - \vec{r}_{rcvr,est}(t_k)\| \tag{2}$$

Where $t_k$ is the instant of time at which the differential corrections are computed $R_{measured}(t_k)$ is the measured code or carrier phase range at time $t_k$ $T_{sv}(t_k)$ is the satellite's clock error at time $t_k$ $T_{rcvr}(t_k)$ is the receiver's clock error at time $t_k$ $\vec{r}_{sv}(t_k)$ is the location vector of the GNSS satellite time $t_k$ $\vec{r}_{rcvr}(t_k)$ is the location vector of the receiver at time $t_k$ and the subscript "est" means estimated, the subscript "sv" applies to the GNSS satellite and the subscript "rcvr" applies to the GNSS receiver. We keep in mind that $t_k$ is adjusted for signal propagation delays when computing quantities associated with the satellite. Note that the terms in equation (1) within square brackets are all estimates that, when taken together; yield an estimate of the measured range less any sources of error. The difference between this estimate and the measured range is the differential correction which contains the errors in the measured range.

Ignoring noise terms and other less-significant effects, the measured range can be expressed as $$R_{measured}(t_k) = R_{geometric,true}(t_k) - T_{sv,true}(t_k) + T_{rcvr,true}(t_k) + \tau_{iono,true}(t_k) + \tau_{tropo,true}(t_k) + N(t_k) - B_{sv} \tag{3}$$

$$R_{geometric,true}(t_k) = \|\vec{r}_{sv,true}(t_k) - \vec{r}_{rcvr,true}(t_k)\|$$

Where $\tau_{iono}(t_k)$ is the ionospheric delay at time $t_k$ $\tau_{tropo}(t_k)$ is the tropospheric delay at time $t_k$ $N(t_k)$ is an ambiguity term that exists only when $R_{measured}(t_k)$ is measured carrier phase.

It is not present for code phase measurements.

$B_{sv}$ is an inter-frequency, inter-channel, inter-constellation clock bias, or combination of these. It represents biases in the broadcast hardware, such as group-delay, or biases in the time-reference of the GNSS constellation.

The subscript "true" means that these are actual measured quantities and are not estimated from models.

Equation (1) can be rewritten with simplified notation as:

$$\text{Differential}(t_k) = \Delta R - \Delta T_{sv} + \Delta T_{rcvr} - \text{Atmos} - N - B_{sv} \tag{4}$$

The following definitions have been made:

$$\Delta R = R_{geometric,est}(t_k) - R_{geometric,true}(t_k)$$

$$\Delta T_{sv} = T_{sv,est}(t_k) - T_{sv,true}(t_k)$$

$$\Delta T_{rcvr} = T_{rcvr,est}(t_k) - T_{rcvr,true}(t_k)$$

N is an ambiguity term that exists only when correcting carrier phase. It is not present for code corrections.

Inspection of equation (4) gives some insight as to how differential may vary over time. It is important to minimize time-variation for the differential in Set 2 since this differential may be coasted for minutes at a time while the rover undergoes a temporary blockage, or while ambiguities are reestablished following a blockage. The table below summarizes the reasons for variation, over time, of the various components of differential.

TABLE 1

VARIATIONS OF DIFFERENTIAL COMPONENTS

| Differential Component | Reason for Change in value of Component over time |
|---|---|
| $\Delta R$ | This is the difference between geometric and estimated range. This changes for the following reasons: 1) Estimate of receiver location, $\vec{r}_{rcvr,est}(t_k)$, is inaccurate, but the inaccuracy has different x, y, and z components. As the satellite moves across the sky, the projection of these components onto the slant-range vector will vary in magnitude, causing the differential to vary as well. This is usually a slow variation since satellite geometry changes slowly. The variation will not be present if the receiver location is accurate relative to GNSS coordinates, such as in RTK applications for which the base receiver has been accurately surveyed. If the RTK base station is not accurately surveyed, this variation will still exist, even in RTK applications. In practice, the location estimate of the base would have to be very far off (10 meters or more) for this term to change more than a centimeter or two over a few minutes. 2) Estimate of the satellite location, $\vec{r}_{sv,est}(t_k)$, is inaccurate. Information to compute satellite location is provided in broadcast data from the satellite. The satellite ephemeris provided by GPS is usually good to a couple of meters, and the projection along the slant-range vector usually changes slowly. There is one exception: when satellite broadcast parameters change, a sudden jump will appear and this will translate to a jump in $\Delta R$. |
| $\Delta T_{sv}$ | The estimate of satellite clock is derived from data provided in the navigation data stream broadcast by the satellite. The estimate is typically fairly accurate and changes slowly, with the exception of sudden jumps as broadcast parameters change. |

TABLE 1-continued

VARIATIONS OF DIFFERENTIAL COMPONENTS

| Differential Component | Reason for Change in value of Component over time |
|---|---|
| $\Delta T_{rcvr}$ | This is the difference between estimated and true receiver clock. If the GNSS receiver does a good job of estimating its own clock error, then this term will be small. One way to at least keep this term nearly constant (not varying) is to make use of the fact that it is common to all observations (and thus all differential correctors) since they all share the same receiver clock. One observation can be chosen as a reference and then differenced with other observations to cancel-out the contribution of the common clock. Typically, the reference is taken as the highest satellite. Other well-known techniques can be deployed, but generally they all rely on taking advantage of the commonality of this term to all correctors or observations. |
| Atmos | This is the atmosphere-induced delay term, or advance in the case of carrier phase passing through the ionosphere. It is due to the effects of troposphere and ionosphere on the signal propagation speed. The term is not constant, but typically changes slowly since satellite geometry changes slowly. It may change more rapidly at low satellite elevation angles. The location of the pierce-point through the ionosphere and troposphere is the biggest factor in the change as will be discussed. A smaller part of the change is due to fluctuation in the levels of ionosphere and troposphere; the troposphere mainly as storms pass through, and the ionosphere mainly due to high solar activity and movement of the sun relative to the pierce point. There is ample material in the existing GNSS literature describing these effects. |
| N | This is an ambiguity term. It appears when computing differential for carrier phase since the carrier phase measurement may undergo a cycle-slip do to track-loop stress. The term is always a multiple of the carrier wavelength. If cycle slips can be avoided, this term will be a constant. It is not present in code phase observations. |
| $B_{sv}$ | This inter-channel, inter-constellation bias usually has very good long-term stability as is nearly constant. |

Of the above terms, only $\Delta T_{rcvr}$ is common to all differential corrections. In conventional DGNSS, it is usually not a concern since it appears common to all observations that have been corrected by the Set 1 differential corrections. Because it is common, it is fully recovered and is removed as part of the estimate of the rover's own clock. It does not cause any loss of location accuracy, but does effect time estimation. In the methods disclosed here, however, it is advantageous to insure that the Diff Set 2 differential corrections also share this common clock term and maintain the trajectory of this term during times of coasting between updates. If they do not, a separate clock estimate will need to be formed in the navigation solution for the Obs Set 2 observables that do not maintain the trajectory of the Set 1 common clock. This would add unknowns to the navigation solution and reduce the mathematical strength of the solution.

It is relatively easy to keep the Set 2 clock aligned with the Set 1 clock as the Set 2 correctors are computed (and not coasted). The clock component within the Diff Set 1 differential will be absorbed as part of the navigation clock estimate, $T_{rcvr,est}$ since this estimate is based upon solving location and time using observations corrected with Diff Set 1 differential. Thus, if the clock estimate $T_{rcvr,est}$ from the navigation solution is used to compute the Diff Set 2 differential (see equation 1), the Diff Set 1 clock will automatically appear in the Diff Set 2 differential corrections.

The Diff Set 2 differential may not be computed every epoch. FIG. 2 shows that a quality check on observations and location accuracy can bypass the computation. An example of such times is when the receiver drops out of RTK lock and location accuracy is no longer sufficient for the intended purpose of the Diff Set 2 differential. During times that the Diff Set 2 differential is not computed but is being updated (coasted) so that it is available for use, it is important to continue to maintain the clock trajectory within the Diff Set 1 differential.

Figure 4A:
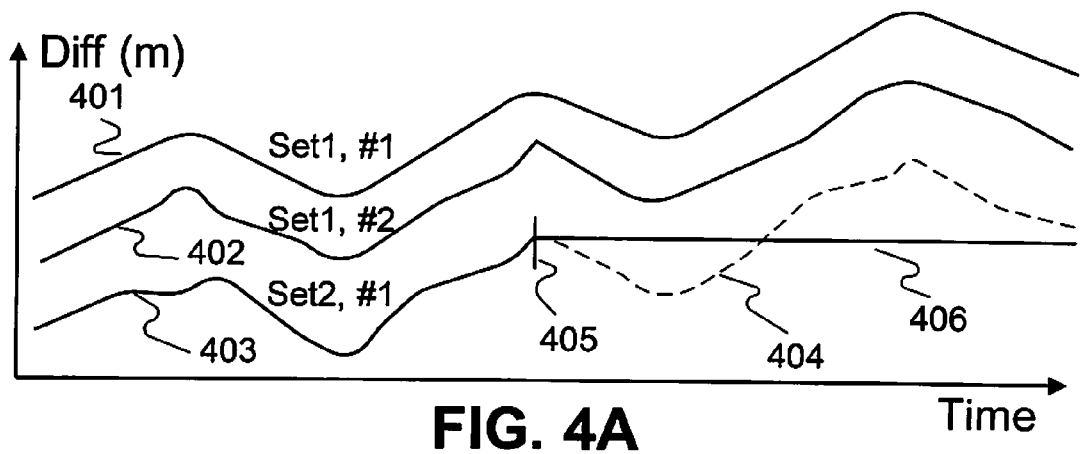
FIGS. 4A-4B are plots each showing three time-series curves of differential corrections, two of which are generated using information from an external source of measurements, and one of which is generated using a local source of measurement information. Coasting occurs on the latter correction.
Figure 4B:
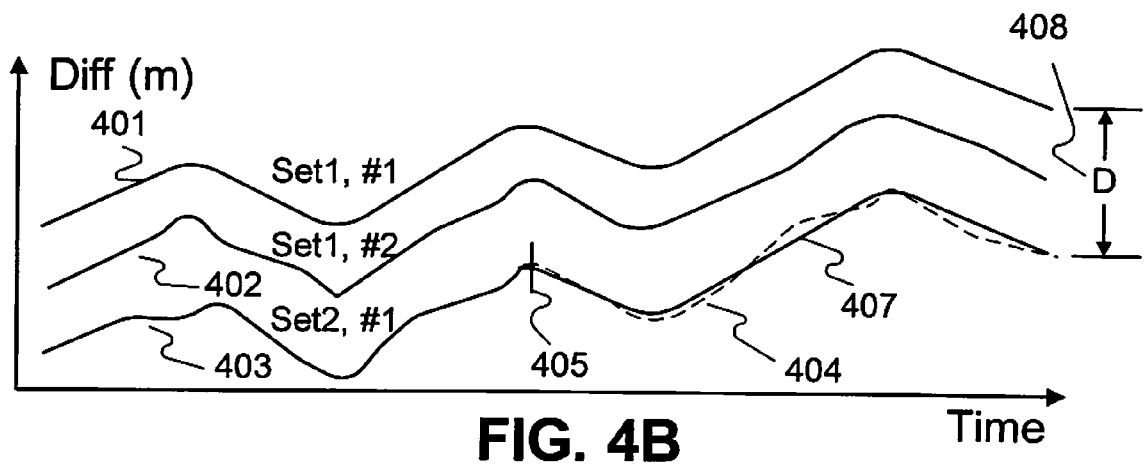
Figure 4C:
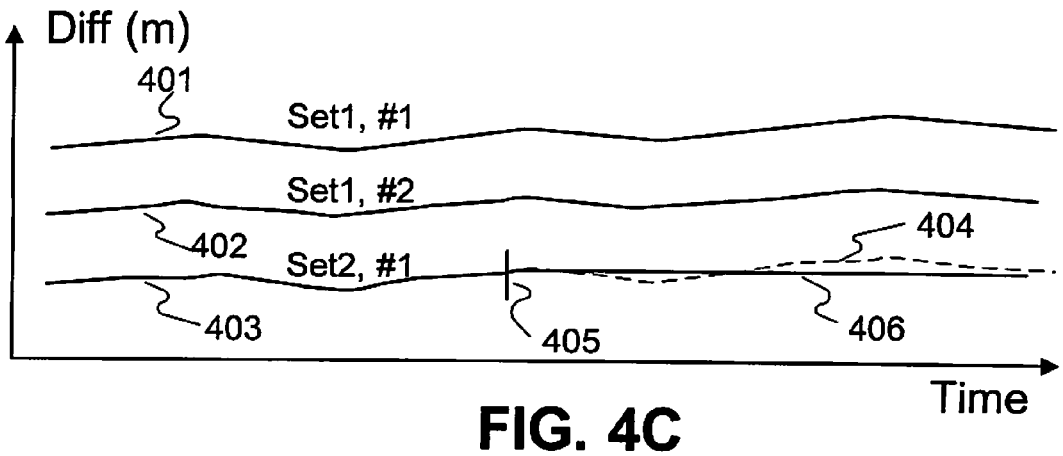
FIG. 4C shows that in three differential correction curves, the common clock characteristic has been reduced and is well modeled in coasting.

FIGS. 4A-C illustrates methods of maintaining the clock trajectory. Two curves, 401 and 402 depict two time-series plots of Diff Set 1 differential corrections. A third curve, 403, shows a plot of a single Diff Set 2 differential correction. The Diff Set 2 differential correction 403 is computed until point 405 at which time the computations cease and the correction must be propagated forward if it is to remain valid. Prior to point 405, the characteristic clock wander can be seen in all three curves. Slight differences can be seen due to non-clock contributions, but all three curves exhibit a common fluctuation characteristic of an imperfect receiver clock estimate.

In FIG. 4A, the simple method of holding the correction constant is shown. The horizontal line 406 represents this constant value whereas the dotted curve 404 represents the value that the correction would take if still being computed. Clearly, if there is a strong clock trend, this method has disadvantages. After a short period of time the constant differential assumption will no longer be valid and the time-out threshold will need to be set low to prevent differential use after even a relatively short period of coasting.

In FIG. 4B a different approach is taken. Rather than holding the differential constant, the Diff Set 2 differential correction is forced to conform to the trajectory of one of the Set 1 corrections. If at point 405, the difference between line 403 and 401 is denoted "D" then this distance "D" is maintained thereafter as shown at 408. The resulting curve 407 much more closely follows the desired trajectory 404.

Another approach is shown in FIG. 4C. Here, the Diff Set 1 differential is computed in such a manner that the receiver clock is not present to any significant degree and this translates into small Set 2 clock-induced variability as well. This is a preferred method of computing differential in general since clock-induced fluctuations can make it difficult to detect problems such as cycle slips. As mentioned, the common clock component can be removed by using a reference satellite in a double-difference approach, or otherwise assuring that the base receiver clock estimate is accurate when computing Diff Set 1 differential.

The curves 401, 402 and 403 are shown considerably flattened as a result of eliminating most of the receiver clock induced wander. Due to this lack of wander, the assumption that the Set 2 differential correction is constant after point 405 has more validity. It can be seen that the constant curve 406 is much closer to the true trajectory 404 than it was in FIG. 4A. If the Set 1 differential is computed in the base 106 rather than the rover 107, it may be easier to apply the scheme of FIG. 4B when significant clock wander is present. Otherwise the scheme of FIG. 4C is preferable.

Figure 5:
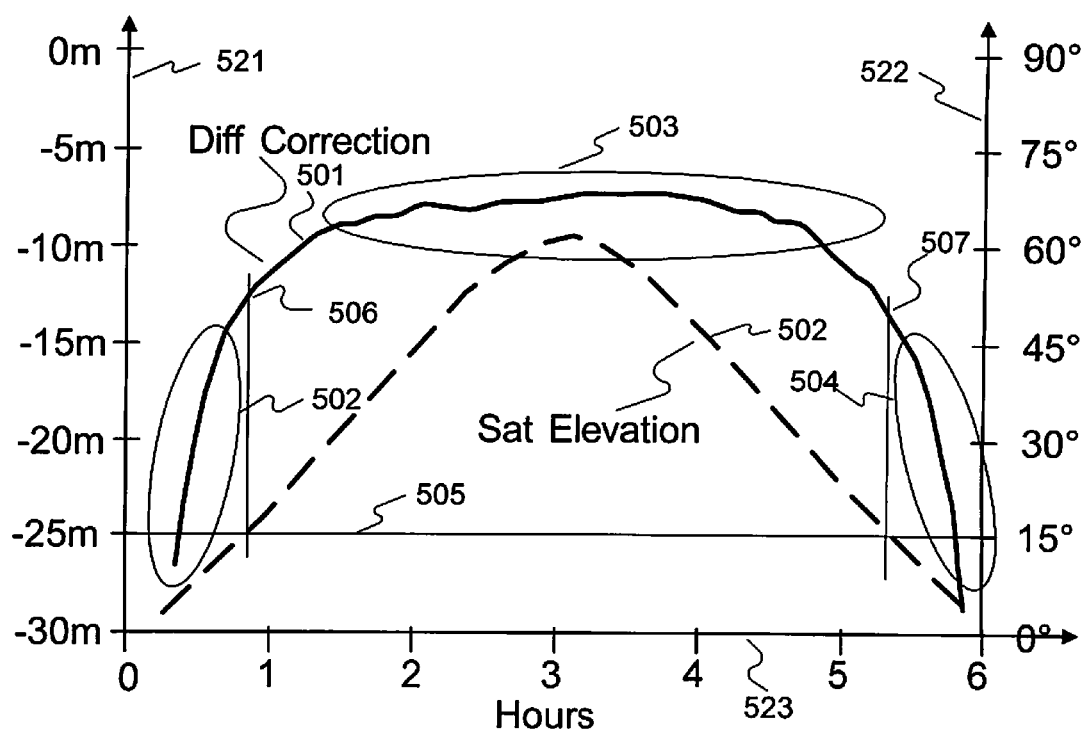
FIG. 5 shows atmospheric effects on the differential corrections in relation to satellite elevation angle.

Atmospheric effects are one of the largest contributors to changes in the value of the differential corrections. FIG. 5 shows a typical differential correction from the time a satellite rises until it sets. Curve 501 is the differential correction with corresponding scale provided on axis 521. Curve 502 is the elevation angle that the satellite makes with the horizon, and the elevation angle scale is shown on axis 522. Plots are against a time axis 523. The highest slopes within the differential curves are found in regions 502 and 504 as the satellite rises and sets. As the satellite elevation increases, we see that the differential in region 503 maintains a more constant value. A 15 degree elevation angle, 505, is projected up along vertical lines to the differential curve at points 506 and 507 to show that 15 degrees is roughly where the slope of the differential curve begins to increase sharply.

This phenomenon of rapid changes at low elevation angle is mainly due to an obliquity factor (see "The Global Positioning System" by Bradford W. Parkinson, James J. Spilker, p. 148). Ionosphere-induced delay is roughly three times larger for satellites viewed near the horizon than it is for satellites viewed near the zenith. The troposphere obliquity can be even larger since signals traveling horizontally to a receiver on the ground travel a much greater distance through the troposphere than do signals traveling vertically. The troposphere obliquity (or slant factor) is roughly the reciprocal of the sine of the elevation angle and can exceed a ratio of 20:1.

As the satellite traverses the sky, the elevation angle changes and so do the ionosphere and troposphere obliquity factors. The change is most rapid when the satellite is low. Two ways to deal with this are: 1) time-out the differential sooner for low elevation satellites, and 2) use a model of the ionosphere and the troposphere to predict the change and update the differential accordingly. The model method can include information provided in a satellite broadcast message such as the GPS ionosphere model or an ionosphere grid model provided by an SBAS system. The model may also include predictions based on past observations, or observations of the ionosphere-induced code and carrier phase divergence. A combination of early time-out and atmospheric model can be utilized, especially if the atmospheric model does a poor job of predicting reality. A time-out decision is shown in FIG. 2 at 214.

Figure 6:
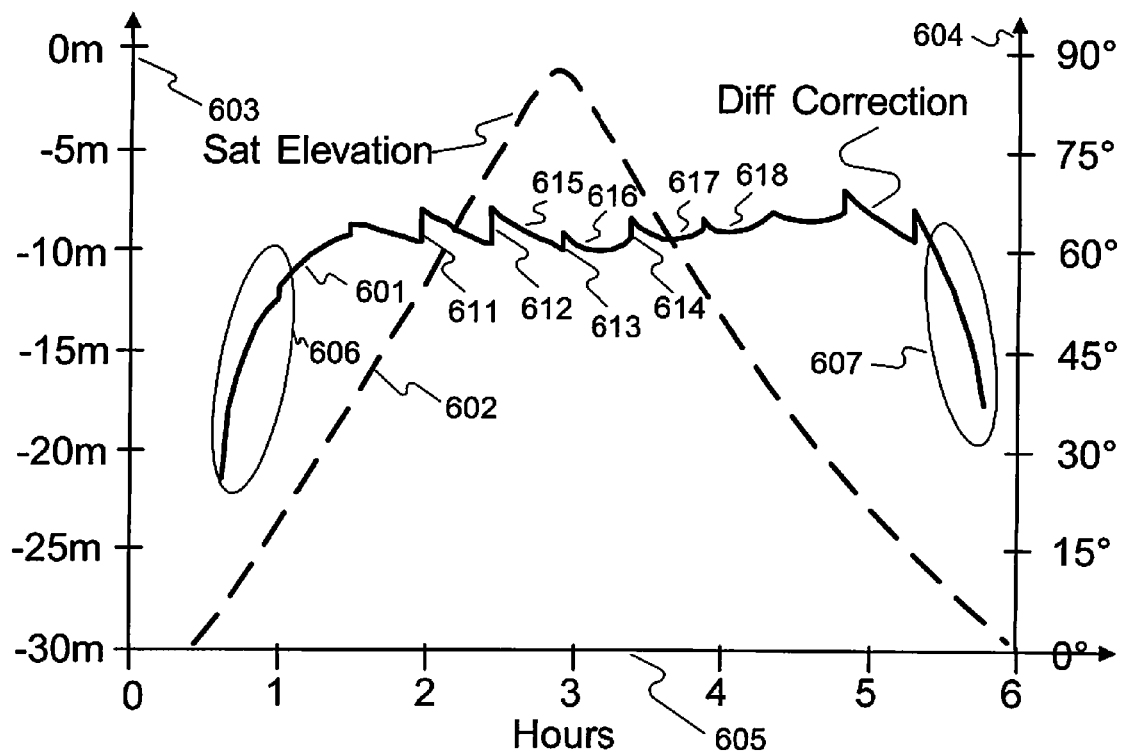
FIG. 6 shows both atmospheric effects on the differential corrections in relation to satellite elevation angle and effects of satellite orbit model changes.

FIG. 6 again shows a differential correction curve 601 and a corresponding satellite elevation curve 602. The scales are shown on axes 603 and 604 respectively and the values are plotted against a time-axis 605. Again, regions 606 and 607 are seen to exhibit large atmosphere-induced slopes. This differential is typical of that from a GLONASS satellite. When using the GLONASS system, the provided orbit model consists of the satellite state of position, velocity, and acceleration. In the receiver, the state is propagated forward using a Runge-Kutta integration technique. The satellite state model parameters are usually updated every half hour in the GLONASS broadcast message. The resulting discontinuities caused by the update can be seen as jumps 611, 612, 613 and 614 of the differential curve. The discontinuities occur as corrections to the state model are made. In the regions 615, 616, 617 and 618 between orbit model updates, some slow variation is apparent in the differential correction term 601. This variation is due to an imperfect orbit state model provided by GLONASS. Errors in the acceleration state appear to have a parabolic nature as evident in region 616 of the differential curve. Velocity model errors exhibit more of a constant slope such as that seen in region 615.

In propagating differential forward, it is necessary to account for the jumps that result from satellite orbit or clock model changes by re-computing using the new model; otherwise the differential is not valid after a model parameter crossover.

Figure 7:
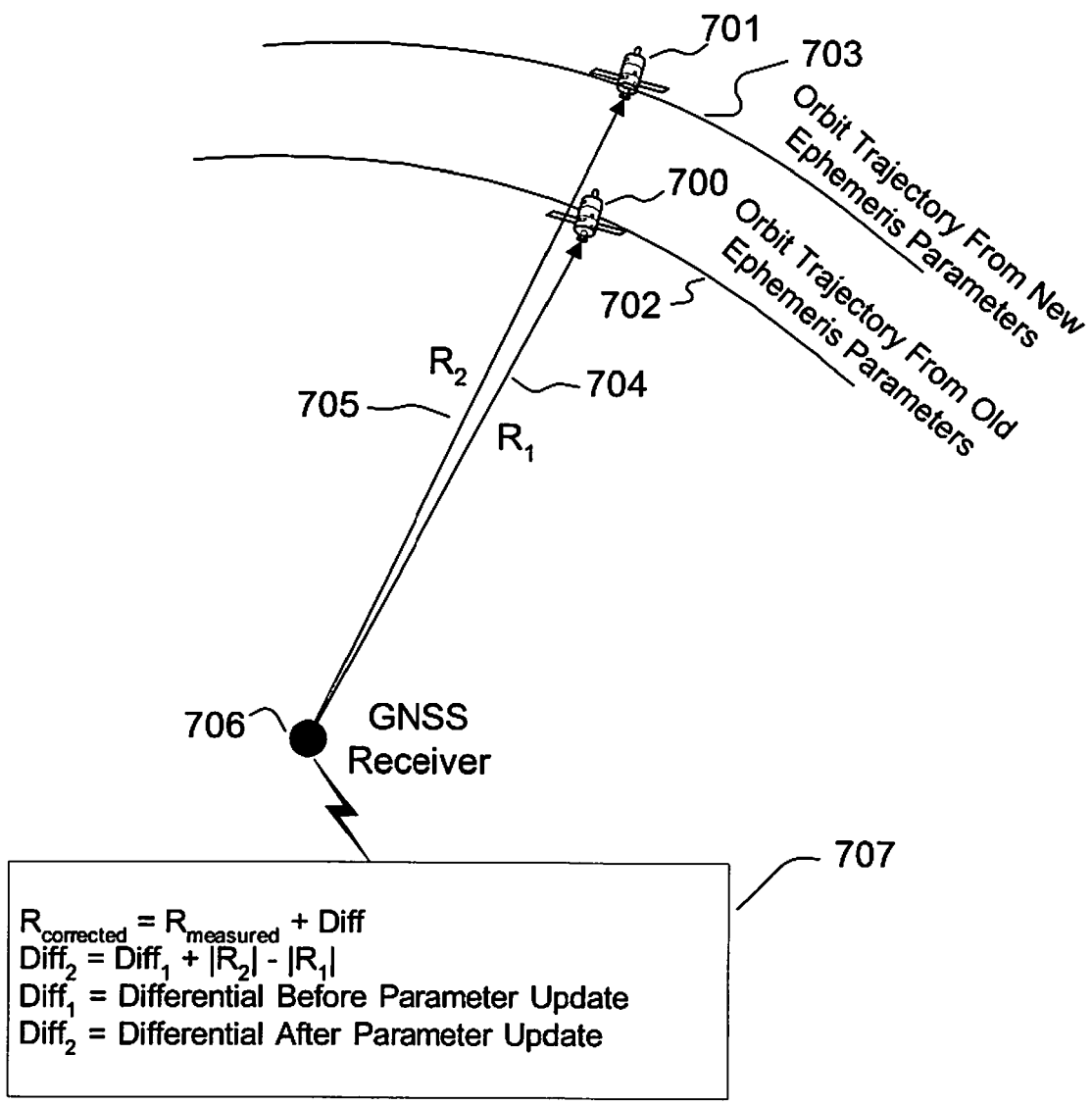
FIG. 7 shows how to compensate for satellite orbit and clock model changes to differential corrections while coasting.

FIG. 7 shows how to update the differential when an orbit model changes. The orbit trajectories resulting from using these parameters are shown as 702 (old parameter set) and 703 (new parameter set). Also shown are the two geometric ranges 704 and 705 for the old and new parameters, respectively. The change in these geometric ranges is used, along a computed change in the clock model to make the one-time adjustment as follows:

$$\text{Diff}_{clock} = \text{Diff}_{clock} + \alpha 1 + \alpha 2, \text{ (a one-time adjustment as the new parameters are applied)} \quad (22)$$

$$\alpha 1 = \|\vec{r}_{sv,est,new}(t_n) - \vec{r}_{rcvr,est}(t_n)\| - \|\vec{r}_{sv,est,old}(t_n) - \vec{r}_{rcvr,est}(t_n)\|$$

$$\alpha 2 = T_{sv,est,old}(t_n) - T_{sv,est,new}(t_n)$$

$t_n$ is the time at which the new ephemeris and clock parameters are applied $\vec{r}_{rcvr,est}(t_n)$ is the estimate of the receiver's position at time $t_n$ $\vec{r}_{sv,est,old}(t_n)$ is the satellite's position at time $t_n$ computed from the old set of parameters $\vec{r}_{sv,est,new}(t_n)$ is the satellite's position at time $t_n$ computed from the new set of parameters $T_{sv,est,old}(t_n)$ is the satellite's clock error at time $t_n$ computed from the old set of parameters $T_{sv,est,new}(t_n)$ is the satellite's clock error at time $t_n$ computed from the new set of parameters There are numerous advantages to using the invention disclosed here. Some are evident such as the clear advantages of additional DGNSS-corrected observations at critical times. One advantage is that of a faster RTK ambiguity fix (resolution) after a momentary loss of RTK. For example, a L1-only (single frequency) base transmits only L1 observations. A multi frequency (e.g., L1, L2, L5, etc.) rover could, after determining an initial RTK fix using only the L1 observations, use its L2, L5 or other frequency observations in subsequent RTK fixes in accordance with this invention. It is well known that ambiguity resolution using dual frequency L1/L2 (or other multi frequency) observables are significantly quicker than when using L1-only data.

In long-baseline RTK, the initial RTK fix may be difficult due to large differential atmospheric errors between base and rover. Once an RTK fix is obtained, however, subsequent RTK fixes can occur much more quickly; taking advantage of the fact that Diff Set 2 differential can absorb some of the atmospheric errors. The more accurate the rover's location estimate, the better the errors are absorbed. In this application, Diff Set 2 may actually be expanded to include all observables used by the rover since this may best reduce subsequent ambiguity search times (for example, searching after a blockage-induced loss of ambiguities). Even if rover location is not perfect, use of the disclosed method will still assure that all differentially corrected observables agree on a common location and that their residual error is small relative to this location. Agreement of residual error is critical for rapid ambiguity fixing. If all observables agree on a common location, this location will dictate a clear minimum for residual error in an integer ambiguity search. Again, this agreement is due to the fact that differential is computed at the rover rather than the base bypassing atmospheric effects that may occur over long base-rover baselines.

Cycle slip detection is another advantage of the disclosed invention since the method provides, when needed, Obs Set 2 observations that would not otherwise be available. Algorithms such as Receiver Autonomous Integrity Monitoring (RAIM) have been shown to work better as the number of observations is increased.

Another application of the invention is dealing with GLONASS frequency-dependent group-delay biases. Such biases occur, for example, when mixing base and rover receivers from different manufacturers. If GLONASS observations are used as the Obs Set 2 observations, and GPS is used for Obs Set 1, the biases are eliminated since both the differential and the observations for Set 2 are from the same receiver (the rover), and the biases cancel as the differential is applied to the observations. Without the disclosed method, it may be necessary to account for the frequency-dependent biases using more complicated approaches, such as adding a frequency-dependent slope to the GLONASS clock estimate. Of course, combinations of approaches could be utilized. In a GPS/GLONASS RTK application, for example, the initial ambiguity resolution could take place by assuming a frequency-dependent GLONASS clock, but after that, the methods of this invention could be deployed.

In a preferred embodiment, every observation is used, regardless of whether or not a differential pair can be formed using data from an external differential source. Locally generated range corrections are formed as needed per this invention. Velocity-related observations such as Doppler and Delta-Carrier Phase are used as well. Velocity related observations may, in many situations, be used without differencing with a corresponding base velocity observation since the velocity observations from the stationary base are usually near zero and can be assumed as such. Use of velocity to aid a Kalman Filter location solution adds smoothness and robustness.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

Having thus described the disclosed subject matter, what is claimed as new and desired to be secured by Letters Patent is:

1. A method of computing differentially corrected global navigation satellite system (GNSS) measurements within a rover receiver in a GNSS system including a base receiver, which method comprises the steps of:
   at the rover receiver, observing code and carrier phase GNSS signals from first and second satellite sets;
   at the rover receiver, either: 1) receiving from the base receiver GNSS signal observations and a GNSS-defined base receiver location, and computing first satellite set differential corrections; or 2) receiving from the base receiver first satellite set differential corrections;
   storing said first satellite set differential corrections in computer memory in said rover receiver;
   receiving at the rover receiver at a first instant of time (Time 1), first satellite set measurement information;
   computing in the rover receiver at Time 1 a differentially-corrected location for the rover receiver using the first satellite set measurement information and the first satellite set differential corrections;
   observing at the rover receiver, at Time 1, second satellite set measurement information;
   predicting geometric ranges for the second satellite set using the differentially-corrected Time 1 location computed by the rover receiver;
   computing second satellite set differential corrections based on said predicted geometric ranges for the second satellite set minus the observed second satellite set measurement information;
   observing at the rover receiver at a second instant of time (Time 2), second satellite set measurement information; and
   computing, at Time 2, the rover receiver's location using the second satellite set differential corrections and the Time 2 second satellite set measurement information.

2. The method of claim 1, which includes the additional step of:
   solving for integer ambiguities in said second set of satellite measurement information.

3. The method of claim 1 wherein GNSS satellite measurement information is received by said rover receiver from one or more of the group consisting of: GPS; GLONASS; Galileo; Compass; a satellite-based augmentation system (SBAS); a regional satellite system; the wide-area augmentation system (WAAS); a transmitter located on or near the ground; and a pseudolite.

4. The method of claim 1 wherein said GNSS satellite measurement information contains one or more of the group consisting of: a phase; and a pseudorange.

5. The method of claim 1 wherein said differential enabling data contains one or more from the group consisting of: a differential correction; clock correctors; orbit correctors; a pseudorange; and a phase.

6. The method of claim 1 wherein said communication link is to one or more of the group consisting of: a base station; an SBAS satellite; an Inmarsat satellite; and a network RTK source.

7. The method of claim 1, which includes the additional step of:
   updating the second satellite set differential corrections based on the Time 1 minus Time 2 variation from the first satellite set differential corrections.

8. The method of claim 1, which includes the additional steps of adjusting the second set of differential corrections for:
   modeled atmospheric changes; and
   orbit/ephemeris parameter changes.

* * * * *